Jan. 5, 1971 J. NAGY, JR 3,553,566

RECTIFIER UTILIZING PLURAL CHANNELS FOR ELIMINATING RIPPLE

Filed March 12, 1968

INVENTOR
JOHN NAGY, JR.

BY
Arnold, Roylance, Kruger & Durkee
ATTORNEYS

United States Patent Office 3,553,566
Patented Jan. 5, 1971

3,553,566
RECTIFIER UTILIZING PLURAL CHANNELS FOR ELIMINATING RIPPLE

John Nagy, Jr., Union, N.J., assignor to Weston Instruments, Inc., Newark, N.J., a corporation of Delaware Filed Mar. 12, 1968, Ser. No. 712,538
Int. Cl. H02m *7/00;* G01r *19/22;* H03f *1/34*
U.S. Cl. 321—8 4 Claims

ABSTRACT OF THE DISCLOSURE

An operational rectifier or converter including a series RC circuit to conduct an AC signal to a summing junction and a second circuit parallel to the series RC circuit for developing a DC component and an inverted AC component to cancel the AC conducted by the series circuit. The second circuit includes an operational amplifier having two identical diode-resistance feedback circuits. The DC component and one half of the AC component is taken from one feedback circuit through a resistor, and the other half of the AC component is coupled from the other feedback circuit through a capacitor, to the output terminal. A second embodiment shows suppression and compensation circuits to refine circuit operation.

This invention relates to precision rectifier apparatus and more specifically, to circuit apparatus for converting an undulating electrical signal into a direct current for precise measurement.

In the field of instrmentation it is desirable to convert alternating electrical signals into direct current signals for application to measuring instruments which are capable of accepting only DC signals. Clearly any such conversion must be done in such a manner that no non-linearities or error factors are introduced by the conversion apparatus. Thus, a simple rectifier, such as a diode bridge, cannot be used. The advantage of making the conversion is that the measuring apparatus can be simpler and substantially less expensive, with little sacrifice in accuracy, than an instrument designed to measure any signal, AC or DC, without prior conversion.

It is also desirable that the conversion apparatus be capable of rectifying signals over a wide frequency range. Further, the apparatus should be compact and inexpensive enough to constitute a small adapter device to accompany the instrument.

Operational rectifiers have been designed by prior art workers, as exemplified by U.S. Pat. 3,196,291, Woodward. However, the components required by a device of the Woodward type include filter capacitors and other components of a prohibitively large size in order to properly eliminate ripple in the DC output when the AC input is at a low frequency.

An object of the present invention is to provide a precision rectifier apparatus capable of converting an AC signal to a proportional value DC signal without ripple.

A further object is to provide a precision rectifier which requires components of relatively small physical size.

Another object is to provide a precision signal converter usable over a wide frequency range.

Figure 1:
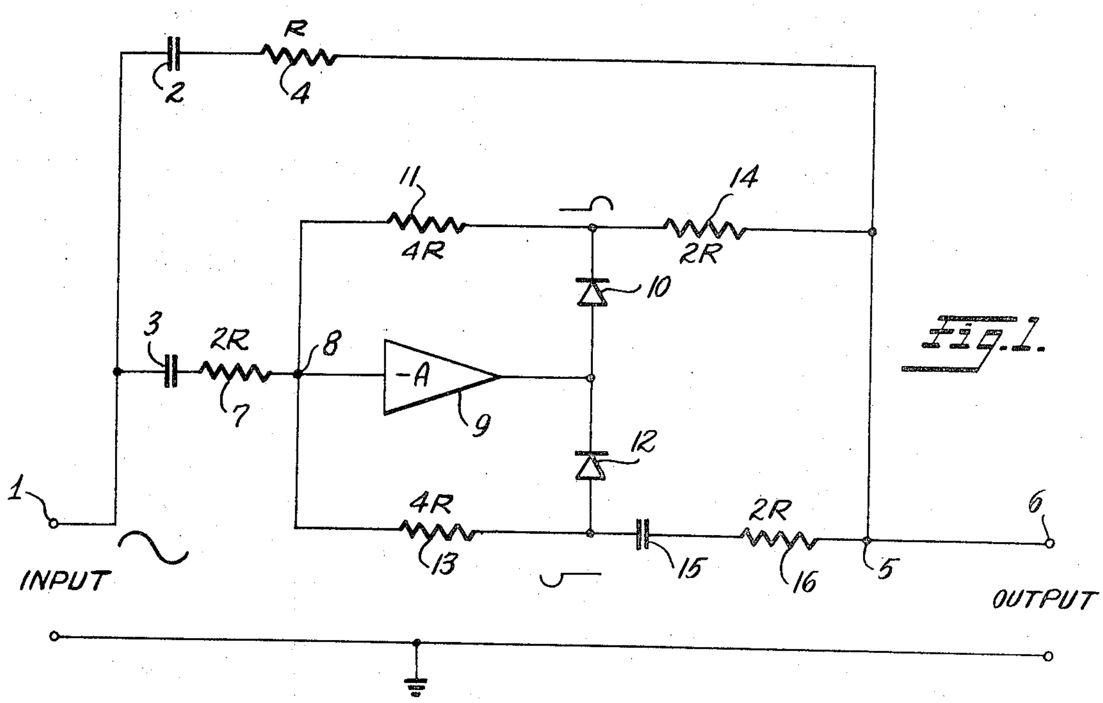
Figure 2:
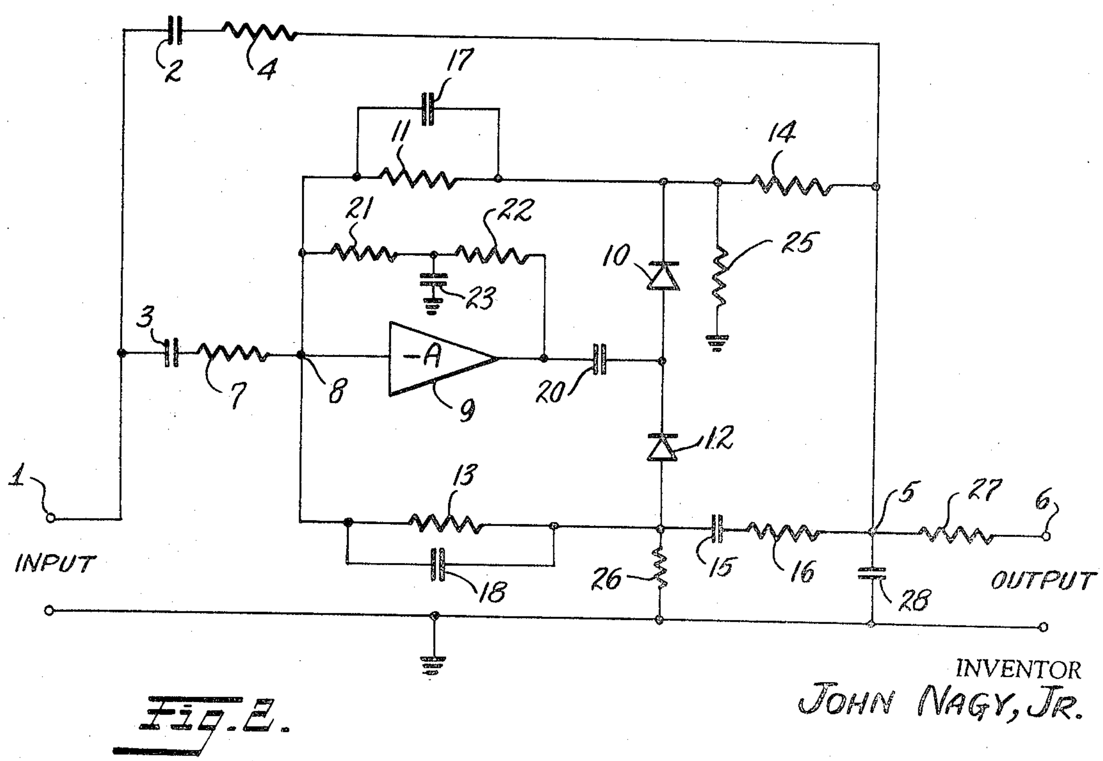

In order that the manner in which the foregoing and other objects are attained in accordance with the invention can be understood in detail, particularly advantageous embodiments thereof will be described with reference to the accompanying drawings, which form a part of this specification, and wherein:

FIG. 1 is a schematic diagram of one embodiment of a converter in accordance with the invention; and FIG. 2 is a schematic diagram of a second embodiment of the invention provided with specific drift and frequency compensation.

Broadly described, apparatus in accordance with the invention includes a two-channel circuit wherein one channel conducts the input signal through summing resistance to the utilization device and the other channel, connected in parallel circuit relation with the first, develops a DC signal and an inverted undulating signal which is summed with the input signal. The DC signal is delivered to the utilization instrument but the AC portions of the signals from the first and second channels cancel each other, eliminating ripple.

Referring now to FIG. 1, the input signal is applied between an input terminal 1 and ground and is connected directly to one terminal of a capacitor 2 and to one terminal of a capacitor 3. The other terminal of capacitor 2 is connected to one terminal of a resistor 4, the other terminal of which is connected to a junction 5 and an output terminal 6.

The other terminal of capacitor 3 is connected through a resistor 7 to a summing junction 8 at the input terminal of a high gain inverting amplifier 9. Amplifier 9 is provided with two feedback circuits one of which includes a diode 10 and a resistor 11 connected in series circuit relationship with the anode of diode 10 connected to the output terminal of amplifier 9. The other feedback circuit includes a diode 12 and a resistor 13 connects in series circuit relationship with the cathode of diode 12 connected to the output terminal of amplifier 9. A summing resistor 14 is connected between the cathode of diode 10 and junction 5. The anode of diode 12 is coupled to junction 5 through a capacitor 15 and a summing resistor 16 connected in series circuit relationship.

It will be assumed, for purposes of discussing the operation of the apparatus of FIG. 1, that an input signal of one volt AC is applied to terminal 1, this signal being coupled through capacitor 2 and summing resistor 4 to output terminal 5, and through capacitor 3 and resistor 7 to the amplifier circuit. As will be recognized by those skilled in the art, the AC signal produces an alternating current flow through resistor 4 to junction 5. Likewise, an AC current flows through resistor 7 to the summing junction at the input of high gain inverting amplifier 9. During the first (positive) half cycle, current flows through the feedback circuit including diode 12 and resistor 13, producing a current to summing junction 8 which maintains the junction at virtual ground, in the manner of usual operational amplifier operation. The negative half cycle voltage developed across resistor 13 and appearing at the junction of diode 12 and resistor 13 is coupled through capacitor 15 and resistor 16 to junction 5 where it is summed with the AC signal through resistor 4. During the second (negative) half cycle of the input signal current flows through diode 10 and resistor 11, similarly maintaining junction 8 at virtual ground and producing a positive half cycle voltage at the junction of diode 10 and resistor 11, the positive half cycle being coupled through resistor 14 to junction 5 to similarly be summed with the signal flowing through resistor 4. Because of the relationship of the values of resistors 13 and 11 to resistor 7, a ratio to 2:1 as shown in FIG. 1, a DC current is provided at junction 5 which is proportional to the magnitude of the input signal. However, the phase inversion of the alternating portion of the signal is exactly inverted from the signal provided through resistor 4, allowing the AC portions to be cancelled, leaving only a DC signal at junction 5 and hence, at output terminal 6. Using a value of 50,000 ohms for the value R of resistor 4 and maintaining resistors 7, 11, 13, 14 and 16 in the ratios shown in FIG. 1, an input signal of one volt AC produces an output current of 10 microamperes which is a suitable input for a DC digital voltmeter of various types generally identifiable as 10 milliampere, 150 microvolt digital voltmeters.

It will be observed that the DC output signal will always be in the same polarity because of the polarization of diodes 10 and 12 so that the instrument, or other utilization device, connected to terminal 6 can be a relatively simple instrument which need be responsive only to DC signals of the one polarity. Capacitive coupling of capacitor 15 prevents a DC shunt circuit across the output of the amplifier. A ciricuit of the type shown in FIG. 1 it suitable for use over a relatively wide frequency range extending from approximately 5 hertz to 2,500 hertz. For a circuit of this type the capacitors can be of a value of approximately 1 microfarad.

It is possible at higher frequencies for particular response peaks to develop because of the reactive impedances in the circuit of FIG. 1. For a converter usable over a wider frequency range some additional linearizing circuitry is desirable. An example of suitable circuitry is shown in FIG. 2 wherein the same identifying numerals have been used for the components shown and discussed in FIG. 1. In the circuit of FIG. 2, additional capacitors 17 and 18 are connected in parallel circuit relationship with resistors 11 and 13, respectively, to diminish a particular response peak at an elevated frequency. Capacitors 17 and 18 are, for this purpose, in the order of 5–10 picofarads. An additional capacitor 20 is connected between the output of amplifier 9 and the junction of diodes 10 and 12 to isolate any DC drift effects associated with the amplifier. The addition of this capacitor requires an additional stabilizing feedback path which, in FIG. 2, includes the series connection of resistors 21 and 22 and by-pass capacitor 23, included to maintain AC gain in the amplifier.

Resistors 25 and 26, connected from the cathode of diode 10 to ground and from the anode of diode 12 to ground, respectively, are included to load the output circuit for the purpose of attenuating any drift in DC level at the input of the amplifier which could be conducted through the resistive circuits including resistors 11 and 14 and 13 and 16 to summing junction 5. An output resistor 27 and a shunt output capacitor 28 can also be provided as an output filter. With the circuit as shown in FIG. 2, using an 8 microfarad capacitor for capacitor 28, the net error at the output is reduced to plus or minus .02% at an input frequency of 50 hertz and the net error over a 10,000 hertz frequency range is not greater than .03%. Thus, it will be seen that with circuit components of relatively small physical size, and with minimal filtering, an extremely accurate response is provided with sample, inexpensive circuitry thereby allowing the use of a relatively simple measuring instrument.

While certain advantageous embodiments have been chosen to illustrate the invention, it will be understood by those skilled in the art that various changes and modifications can be made therein without departing from the scope of the invention.

What is claimed is:

1. Rectifier circuit means comprising an input terminal to which an undulating electrical signal can be applied; an output terminal connectable to a utilization device; first circuit means interconnecting said input and output terminals for coupling the AC component of said input signal to said output terminal; and second circuit means interconnecting said input and output terminals for providing at said output terminal a DC signal component proportional in magnitude to a preselected characteristic of said input signal and an AC component equal in magnitude and opposite in phase to the AC component provided by said first circuit means, said second circuit means comprising a high gain amplifier; a first feedback circuit including a first resistor and first diode connected in series circuit relationship between the input and output terminals of said amplifier; and a second feedback circuit including a second resistor and a second diode connected in series circuit relationship betwen the input and output terminals of said amplifier; said first and second diodes being poled in opposite directions relative to the output terminal of said amplifier; each of said first and second circuit means including at least one summing resistor connected to said output terminal.

2. Apparatus according to claim 1 wherein said summing resistor in said second circuit means is connected between the junction between said first diode and said first resistor in said first feedback circuit and said output terminal; and the diode-resistor junction in said second feedback circuit is connected to said output terminal by a circuit including a capacitor and a resistor connected in series circuit relationship.

3. Apparatus according to claim 2 wherein said second circuit means includes a capacitor and a resistor connected in series circuit relationship between said input terminal and the input terminal of said amplifier.

4. Rectifier apparatus comprising an input terminal to which a time-varying electrical signal can be applied; an output terminal connectable to a utilization device; first circuit means interconnecting said input and output terminals for coupling the AC component of said input signal to said output terminal; and second circuit means interconnecting said input and output terminals for providing at said output terminal a DC signal component proportional in magnitude to the magnitude of said input signal and an AC component equal in magnitude and opposite in phase to the AC component provided by said first circuit means, each of said first and second circuit means including at least one summing resistor connected to said output terminal, and wherein said second circuit means comprises a high gain amplifier; first and second feedback circuits capacity coupled to the output of said amplifier and connected to the input of said amplifier, each of said feedback circuits including an asymmetrically conductive device; means for connecting said first feedback circuit to said output terminal; and capacitive circuit means for coupling said second feedback circuit to said output terminal through said summing resistor.

References Cited

UNITED STATES PATENTS

| | | | |
|---|---|---|---|
| 3,112,449 | 11/1963 | Miller | 307—229X |
| 3,121,200 | 2/1964 | Samson | 307—229X |
| 3,360,727 | 12/1967 | Justice | 324—123 |
| 3,238,383 | 3/1966 | Falk | 321—8X |
| 3,311,835 | 3/1967 | Richman | 328—26X |
| 3,411,066 | 11/1968 | Bravenec | 324—119X |

WILLIAM H. BEHA, Jr., Primary Examiner

U.S. Cl. X.R.

324—119; 328—26; 330—104